US012137178B2

(12) United States Patent
Doiron et al.

(10) Patent No.: US 12,137,178 B2
(45) Date of Patent: Nov. 5, 2024

(54) BLOCKCHAIN TRANSACTIONS INCLUDING PORTIONS OF CODE IN DIFFERENT LANGUAGES FOR COMPLEX VALIDATION

(71) Applicant: nChain Licensing AG, Zug (CH)

(72) Inventors: Brock Doiron, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 188 days.

(21) Appl. No.: 17/642,147

(22) PCT Filed: Aug. 19, 2020

(86) PCT No.: PCT/IB2020/057796
§ 371 (c)(1),
(2) Date: Mar. 10, 2022

(87) PCT Pub. No.: WO2021/048661
PCT Pub. Date: Mar. 18, 2021

(65) Prior Publication Data
US 2022/0337437 A1    Oct. 20, 2022

(30) Foreign Application Priority Data
Sep. 12, 2019   (GB) .................................. 1913143

(51) Int. Cl.
*H04L 9/00*       (2022.01)
*G06F 8/20*       (2018.01)
*G06F 8/30*       (2018.01)
(52) U.S. Cl.
CPC ................. *H04L 9/50* (2022.05); *G06F 8/20* (2013.01); *G06F 8/31* (2013.01)

(58) Field of Classification Search
CPC ..... H04L 9/50; G06F 8/20; G06F 8/31; G06F 16/27; G06F 21/64; G06Q 20/401; G06Q 2220/00; G06Q 40/04
See application file for complete search history.

(56) References Cited

U.S. PATENT DOCUMENTS 10,698,728 B1    6/2020  Nelson
10,846,416 B2   11/2020  Uhr et al.
(Continued)

FOREIGN PATENT DOCUMENTS

CN    109074565 A  * 12/2018  ............. G06F 21/30
CN    110692071 A  *  1/2020  ......... G06F 16/2379
(Continued)

OTHER PUBLICATIONS

Gupta et al., "Cloud Computing Security using Blockchain", Jun. 2019, Journal of Emerging Technologies and Innovative Research (JETIR) vol. 6 Issue 6, pp. 791-794 (Year: 2019).*
(Continued)

*Primary Examiner* — John B King
(74) *Attorney, Agent, or Firm* — Messner Reeves LLP

(57) ABSTRACT

A method performed by a node of a blockchain network, comprising: accessing the locking script from a first transaction on the blockchain; receiving a second transaction not yet on-chain, the second transaction comprising an unlocking script; extracting from the first transaction or another transaction on the blockchain, a portion of code formulated in a second language other than a first language used for the locking and unlocking scripts; running the extracted portion of code in the second language, wherein as a result thereof the code generates at least one value; writing this value to a storage location readable by the locking script; and running the locking script together with the unlocking script in order to validate the second transaction, wherein the unlocking script is configured to read the first value from said storage (Continued)

location, and a condition for validation according to the locking script is dependent on the first value.

20 Claims, 5 Drawing Sheets

(56) References Cited

U.S. PATENT DOCUMENTS

| | | | |
|---|---|---|---|
| 11,201,746 | B2 | 12/2021 | Ranganathan |
| 11,515,999 | B1 | 11/2022 | Nelson |
| 2018/0096349 | A1 | 4/2018 | Mcdonald et al. |
| 2019/0116024 | A1* | 4/2019 | Wright .................. H04L 9/3239 |
| 2019/0149337 | A1* | 5/2019 | Savanah ............... H04L 9/3066 713/168 |
| 2019/0199516 | A1 | 6/2019 | Carver et al. |
| 2019/0392489 | A1* | 12/2019 | Tietzen ................ G06Q 20/308 |
| 2020/0195442 | A1* | 6/2020 | Wright ..................... G06F 8/51 |
| 2020/0266985 | A1* | 8/2020 | Covaci .................. H04L 9/3236 |
| 2020/0351235 | A1 | 11/2020 | Shang et al. |
| 2021/0233074 | A1* | 7/2021 | Kramer ..................... H04L 9/32 |
| 2022/0051236 | A1* | 2/2022 | Wright ............... G06Q 20/3823 |
| 2022/0261805 | A1* | 8/2022 | Tartan .................. G06Q 20/407 |
| 2022/0269810 | A1* | 8/2022 | Tartan .................. H04L 9/3247 |
| 2023/0185767 | A1 | 6/2023 | Hung et al. |

FOREIGN PATENT DOCUMENTS

| | | | | |
|---|---|---|---|---|
| CN | 111316595 | A | * 6/2020 | ............ G06F 16/27 |
| CN | 111316615 | A | * 6/2020 | ............ G06K 9/621 |
| CN | 110062034 | B | 11/2021 | |
| JP | 2019220148 | A | 12/2019 | |
| JP | 2020504930 | A | 2/2020 | |
| KR | 20190076197 | A | 7/2019 | |
| WO | WO-2009045257 | A1 * | 4/2009 | ............ G06Q 10/10 |
| WO | 2017145006 | | 8/2017 | |
| WO | 2017195160 | A1 | 11/2017 | |
| WO | 2019008531 | A1 | 1/2019 | |
| WO | 2019116248 | A1 | 6/2019 | |
| WO | 2020109907 | | 6/2020 | |
| WO | 2020109908 | | 6/2020 | |
| WO | 2020109909 | | 6/2020 | |
| WO | 2020109910 | | 6/2020 | |
| WO | 2020109911 | | 6/2020 | |
| WO | 2020109912 | | 6/2020 | |
| WO | 2020109913 | | 6/2020 | |
| WO | 2020110025 | | 6/2020 | |
| WO | 2020212796 | | 10/2020 | |
| WO | 2021048663 | | 3/2021 | |

OTHER PUBLICATIONS

International Search Report and Written Opinion issued in International Application No. PCT/IB2020/057858, mailed on Nov. 6, 2020, 16 pages.

Search Report for the Application No. GB1913145.7 dated Mar. 16, 2020, 4 pages.

Sward A., et al., "Data Insertion in Bitcoin's Blockchain," Mar. 4, 2018, ISSN 2379-5980, 23 pages Retrieved from Internet: URL: http://ledger.pitt.edu/ojs/ledger/article/view/101/93.

Donald E. Knuth, Structured Programming with go to Statements, Computing Surveys, Dec. 1974, pp. 261-301, vol. 6, No. 4, Stanford University, Stanford, California, US.

DR Gavin Wood, Ethereum: A Secure Decentralised Generalised Transaction Ledger Final Draft—Under Review, Jun. 4, 2014, http://gavwood.com/paper.pdf.

PCT/IB2020/057796, International Search Report and Written Opinion dated Nov. 10, 2020.

GB1913143.2 Search Report dated Jun. 1, 2020.

* cited by examiner

Figure 6

| Script | Stack | Off-Chain Computation |
|---|---|---|
| {Non Script Code 2 Input} {Non Script Code 1 Input} {Non Script Code 1} {Expected Output} OP_EQUALVERIFY {Non Script Code 2} | | {Non Script Code 1 Input} {Non Script Code 1} |
| {Non Script Code 2 Input} {Expected Output} OP_EQUALVERIFY {Non Script Code 2} | | {Non Script Code 1 Output} |
| {Non Script Code 2 Input} {Expected Output} OP_EQUALVERIFY {Non Script Code 2} | {Non Script Code 1 Output} | |
| {Non Script Code 2 Input} OP_EQUALVERIFY {Non Script Code 2} | {Expected Output} {Non Script Code 1 Output} | |
| {Non Script Code 2 Input} {Non Script Code 2} | | |
| | | {Non Script Code 2 Input} {Non Script Code 2} |
| | | {Non Script Code 2 Output} |
| | {Non Script Code 2 Output} | |

BLOCKCHAIN TRANSACTIONS INCLUDING PORTIONS OF CODE IN DIFFERENT LANGUAGES FOR COMPLEX VALIDATION

CROSS REFERENCE TO RELATED APPLICATIONS

This application is the U.S. National Stage of International Application No. PCT/IB2020/057796 filed on Aug. 19, 2020, which claims the benefit of United Kingdom Patent Application No. 1913143.2, filed on Sep. 12, 2019, the contents of which are incorporated herein by reference in their entireties.

TECHNICAL FIELD

The present disclosure relates to a method of running a program stored in a transaction on a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of-work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. The state is modified by running smart-contracts which are included in transactions and run when the transactions are validated by nodes of the blockchain network.

SUMMARY

The locking and unlocking scripts used in output-based models typically employ a more limited scripting language than the smart contracts in an account-based model. For instance, output-based models typically employ a stack-based language such as the language simply named Script (capital S). Stack-based languages are not "Turing complete" which means they cannot implement certain types of algorithms such as loops.

For this or other reasons, it would be desirable to enable additional criteria for validation to be included in the locking scripts of transactions in an output-based model, not bound by the limitations of the scripting language recognized by the nodes of the blockchain network.

For instance, it may be desirable to enable functionality akin to the smart contracts of an account-based model, but in an output-based model (e.g. UTXO-based model). As another example, it could be desirable to enable conditions written by a programmer proficient in a second language to be incorporated into the locking scripts of an output-based model that operates primarily based on a first language.

According to one aspect disclosed herein, there is provided a computer-implemented method performed by a node of a blockchain network, wherein copies of a blockchain are maintained across at least some of the nodes of the blockchain network, the blockchain comprising a chain of blocks each comprising one or more transactions, each transaction comprising one or more outputs, and each output comprising a locking script formulated in a first language. The method comprises: a) accessing the locking script from at least a first output of a first of said transactions, the locking script of the first output specifying, in the first language, one or more conditions for unlocking said first output; b) receiving a second transaction not yet recorded on blockchain, wherein the second transaction comprises an input comprising an unlocking script formulated in the first language; c) extracting, from the first transaction or another of the transactions on the blockchain, a portion of code formulated in a second language other than the first language; d) running the extracted portion of code in the second language, wherein as a result thereof the code generates at least one first value; e) writing the first value to a storage location readable by the locking script in the first language; and f) running, in the first language, the locking script from the first output of the first transaction together with the unlocking script from the second transaction, thereby evaluating the one or more conditions, the method comprising validating the second transaction on condition of said one or more conditions being met. The unlocking script is configured to read the first value from said storage location, and the one or more conditions comprise a condition dependent on the first value.

For each of a plurality of transactions including the target transaction, at least some nodes of the network are configured to propagate each transaction on condition of the transaction being valid and at least some nodes are configured to record each transaction in the copy of the blockchain at that node on condition of the transaction being valid. The validity of the target transaction is conditional on the outcome of the code in the second language. If this condition is not met, the transaction will not be propagated through the blockchain network, pooled for mining, nor recorded on the blockchain. Hence functionality written in the second language can be incorporated to set conditions for validity in a model that is otherwise based on validation using the first, scripting language.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
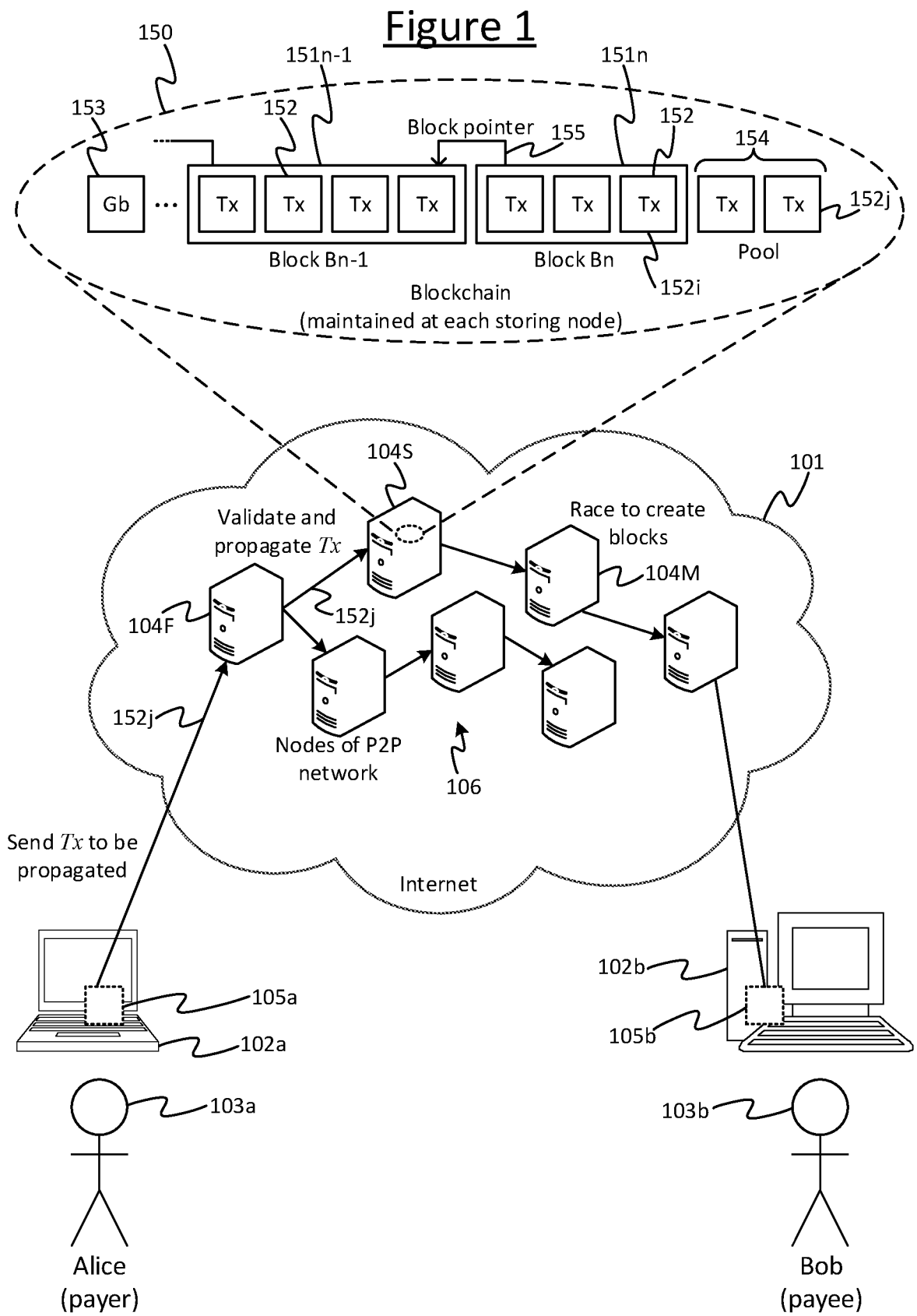
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transaction 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
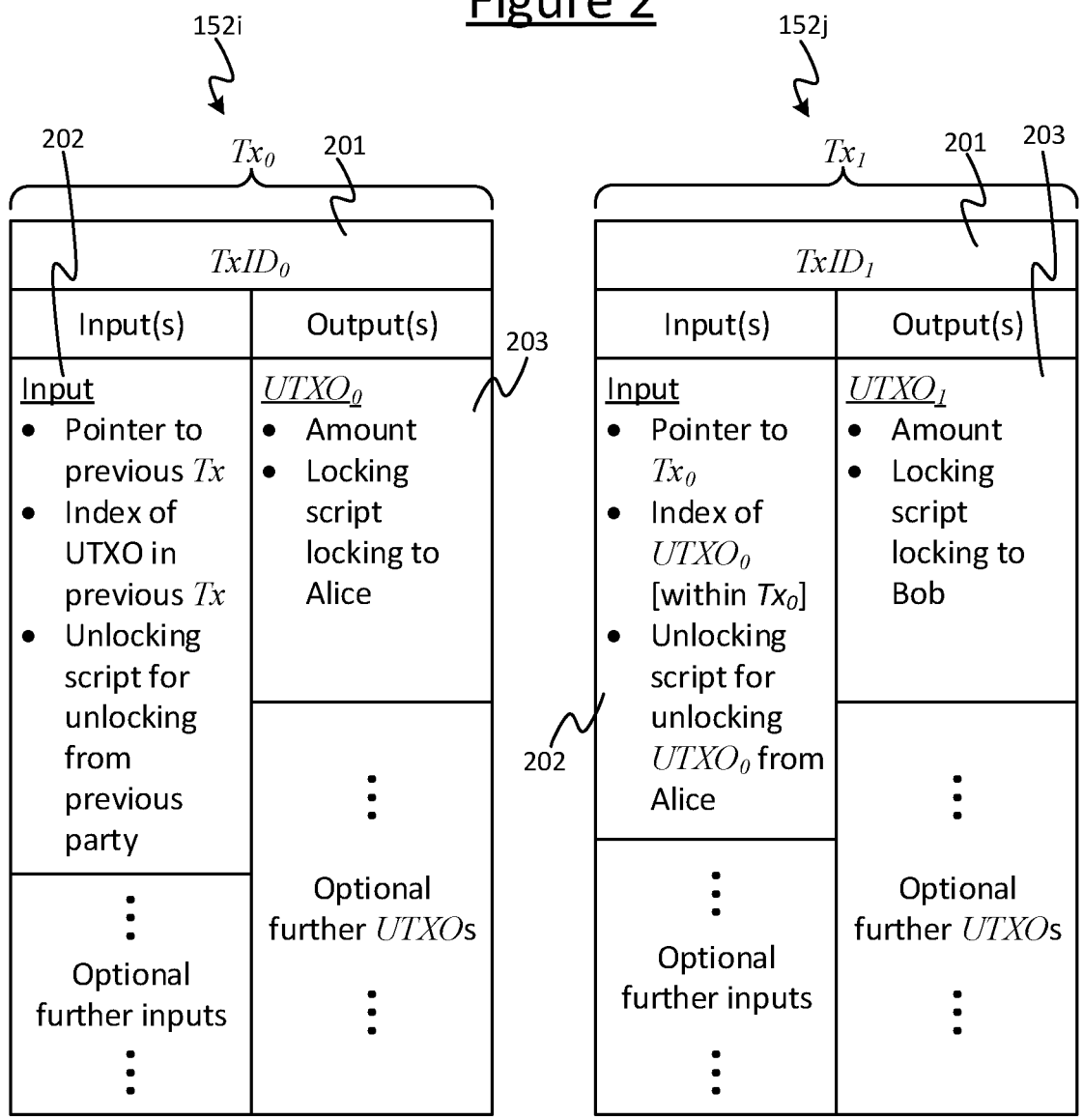

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>\|[Checksig\ P_A]$$

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)>OP_EQUALVERIFY OP_CHECKSIG. "OP_ . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Node Software

Figure 4:
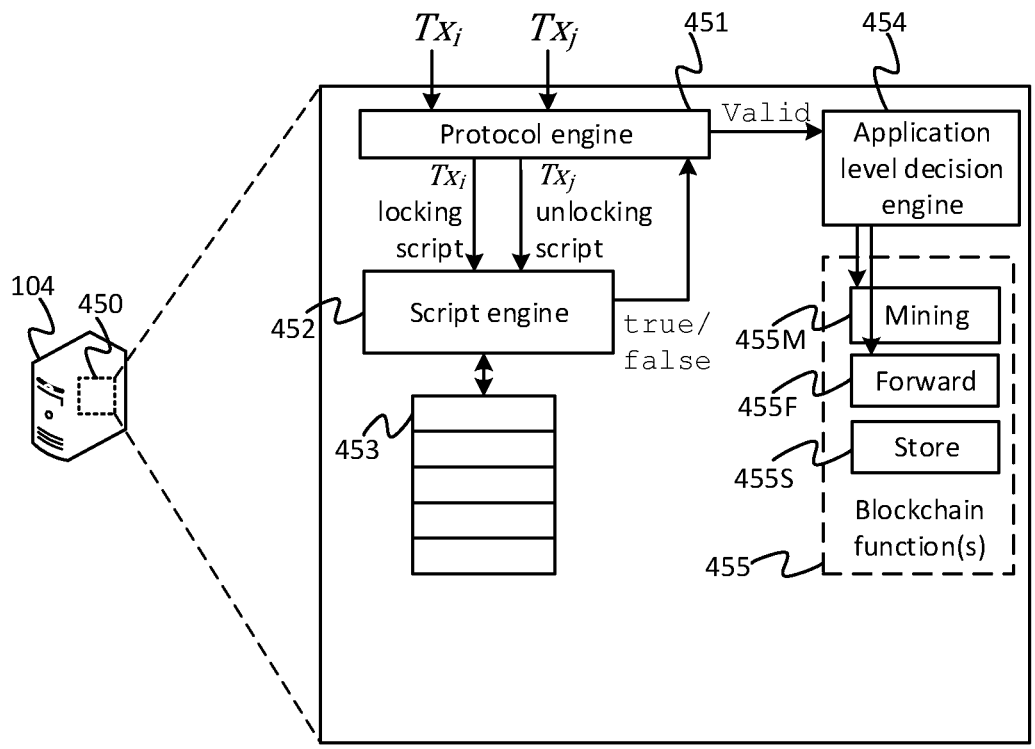
FIG. 4 is a schematic block diagram of some example node software for processing transactions.

FIG. 4 illustrates an example of the node software 450 that is run on each node 104 of the P2P network 106, in the example of a UTXO- or output-based model. The node software 450 comprises a protocol engine 451, a script engine 452, a stack 453, an application-level decision engine 454, and a set of one or more blockchain-related functional modules 455. At any given node 104, these may include any one, two or all three of: a mining module 455M, a forwarding module 455F and a storing module 455S (depending on the role or roles of the node). The protocol engine 401 is configured to recognize the different fields of a transaction 152 and process them in accordance with the node protocol. When a transaction 152$j$ ($Tx_1$) is received having an input pointing to an output (e.g. UTXO) of another, preceding transaction 152$i$ ($Tx_i$), then the protocol engine 451 identifies the unlocking script in $Tx_j$ and passes it to the script engine 452. The protocol engine 451 also identifies and retrieves $Tx_i$ based on the pointer in the input of $Tx_j$. It may retrieve $Tx_i$ from the respective node's own pool 154 of pending transactions if $Tx_i$ is not already on the blockchain 150, or from a copy of a block 151 in the blockchain 150 stored at the respective node or another node 104 if $Tx_i$ is already on the blockchain 150. Either way, the script engine 451 identifies the locking script in the pointed-to output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control one or both of the mining module 455M and the forwarding module 455F to perform their respective blockchain-related function in respect of $Tx_j$. This may comprise the mining module 455M adding $Tx_j$ to the node's respective pool 154 for mining into a block 151, and/or the forwarding module 455F forwarding $Tx_j$ to another node 104 in the P2P network 106. Note however that in embodiments, while the decision engine 454 will not select to forward or mine an invalid transaction, this does not necessarily mean that, conversely, it is obliged to trigger the mining or the forwarding of a valid transaction simply because it is valid. Optionally, in embodiments the application-level decision engine 454 may apply one or more additional conditions before triggering either or both of these functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

In-Line Execution of a Second Language

An increasing amount of data is being stored on the blockchain, leveraging the security and immutability the blockchain provides. Going forward this may include the possibility of programming languages adopting objects that reference TXIDs, as well as executable files being stored on-chain and available to the public. As the mining services begin to emerge, it would be desirable to provide a way for miners to provide a means of decentralised computation, e.g. to eliminate the need for consumers to have large amounts of processing power in their personal devices. In this section, there is disclosed a method to enable such aims or similar through the inclusion of non-Script code within Script codes, to be evaluated off-chain, but whereby inputs and outputs are stored immutably on-chain. This parallels the virtual machines available on certain software such as account-based models.

Note: embodiments herein are exemplified in terms of the Script scripting language being used in the locking and unlocking scripts, and the second language being a non-Script language. However more generally, in other blockchain implementations, the techniques disclosed anywhere herein could be extended to any first and second language, where the first language is any language used in the locking and unlocking scripts which is recognized by the nodes 104 of the blockchain network 106 according to the standard node protocol employed across the blockchain network 106. The second language may be any language other than this. Embodiments are described below, and elsewhere herein, in terms of an example in which the first language is Script and the second language is a non-Script language. However it will be appreciated that this is not limiting, and any mention of Script and non-Script languages anywhere herein could be replaced more generally with the terms "first language" and "second language" respectively. Note also that term "language" as referred to herein means a computer language (i.e. programming language). This could be any form of code (software) recognizable by computer equipment to implement a set of rules, instructions or steps for operating the computer equipment. It could refer to a scripting language, a high-level language to be compiled, a high-level language to be interpreted, an assembly language to be assembled, or a low-level machine code language to be directly executed. Further, note that the term "execute" as referred to herein can refer generally to any such means of running any such program in any kind of language, and is not necessarily meant in a narrower sense of executing machine code instructions for example.

A native extension in software typically describes the process of embedding some code of one programming language in a script of another programming language (e.g. including a C code in a Ruby script). More generally, it is a means to connect one software to another. The embedded script may be compiled and linked locally so the resulting executable file can set a conditional depending on the returned value of the native extension. In this section, script (lower-case) refers to a set of code-based instructions and Script (upper-case) refers to the programming language recognized by the nodes 104 of the blockchain network 106 for use in locking and unlocking scripts to validate transactions 152 according to the node protocol recognized by the nodes 104 of the network 106.

According to embodiments disclosed herein, a script can be defined that uses an external code embedded inside Script code. This script links to an external non-Script library, executes and returns a value into the Script code that can be verified or analysed using, e.g., the standard OP codes. This method can analyse a value using inputs from the blockchain 150 or user as well as be used to select a variety of transaction options. An example schematic of the process is shown in FIG. 3.

Figure 3:
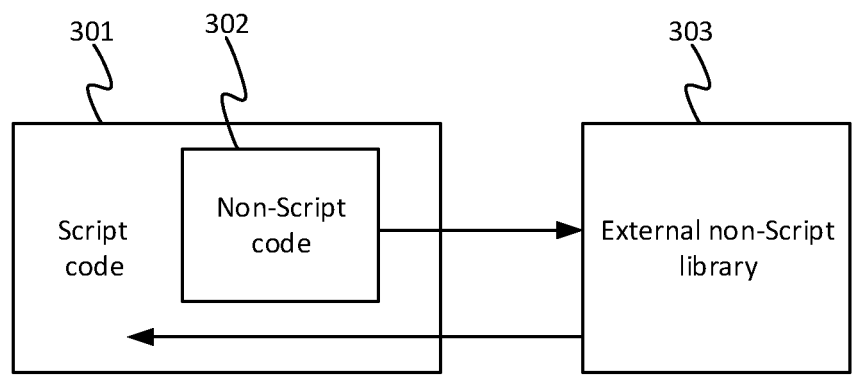
FIG. 3 is a schematic block diagram showing the execution of non-Script code according to embodiments disclosed herein.

FIG. 3 shows an example schematic of the execution of non-Script code 301. The wallet or node software uses a program launcher such as an integrated virtual machine to evaluate the non-Script code 302 with external non-Script libraries 303. In embodiments the results can then be pushed to the stack 453 and evaluated using Script OP codes.

Use of non-Script code can allow for more complex control data and verification steps embedded within a compressed executable file. If the virtual machine that can execute the embedded script is integrated within the wallet or node software, then the blockchain's security and identity verification also can be provided to the software. This can be used to directly target the existing issue of software piracy, for example, as redistributing software would require exposing one's private key in a blockchain-based scenario.

In the script, the control data and/or key verification can be included as a set of conditional statements (e.g. if, else, while) in the non-script code 302. An extractor included in a branch of the script engine 452 can then read the compressed executable file stored in an OP_RETURN, OP_PUSHDATA and/or OP_DROP, and then decompress and run the code on the integrated virtual machine. This process allows data outside the transaction to be accessed by transaction scripts, increasing the versatility of scripts while adhering to the base protocol.

Figure 5:
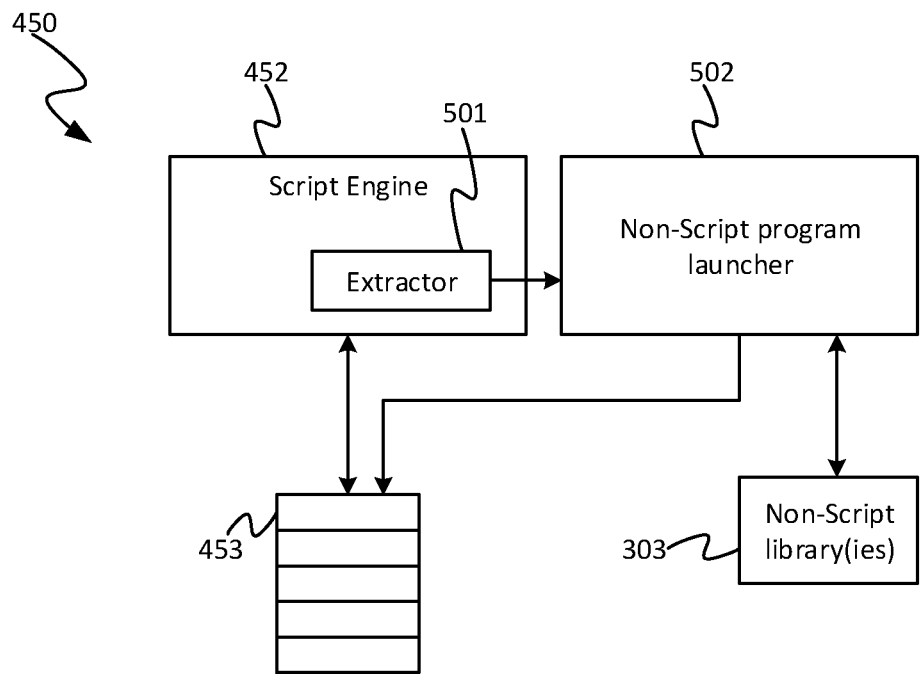
FIG. 5 is a schematic block diagram showing further detail of the node software according to embodiments disclosed herein, and FIG. 6 schematically illustrates a sequence of execution of an example script in accordance with embodiments disclosed herein.

FIG. 5 shows an extension to the node software 450 in accordance with embodiments disclosed herein. The script engine 452 additionally comprises an extractor 501, and the node software 450 additionally comprises a program launcher 502 for running non-Script code 302. The node software 450 may also comprise one or more non-Script libraries 303. The extractor is configured to extract non-Script code 302 from a transaction 152 and pass this to the program launcher 502 to run. In embodiments this may include using one or more of the non-Script libraries 303 to run the non-Script code 302.

The described process is run by the node software 450 on at least one node 104 of the blockchain network. In general this could be any type of node 104 that validates transactions 152: a mining node 104M, a storage node 104S and/or a forwarding node 104F. However in particularly preferred embodiments the process is implemented at least by one or more of the mining nodes 104M. This way the miner is paid to run the non-Script software 302, at least by the inherent mining fee and also by any additional mining fee left explicitly by the payer, e.g. Alice 103a. As will be discussed in more detail shortly, the present disclosure provides a mechanism whereby the non-Script code 302 has to be run in order to validate the relevant transaction, and hence the miner has to run the non-Script code 302 in order to obtain the fee.

The script engine 452 is arranged to receive a first transaction 152i ($Tx_i$) which is already recorded in a block 151 on the blockchain 150. It does this either by accessing its own node's local record of the transactions 152 on the blockchain 150, or by accessing the record on another node 104 (e.g. a storage node 104S). The first transaction $Tx_i$ comprises a spendable output 203 comprising a locking script, i.e. the Script code 301.

The script engine 452 is also arranged to receive a second transaction 152j ($Tx_j$), which is not yet recorded in a block 151 on the blockchain 150. Rather, the second transaction is going to be validated for propagation and/or mining based on the presently disclosed mechanism. The second transaction $Tx_j$ may be received from an end-user's user equipment 102, e.g. from Alice's equipment 102b. Alternatively the second transaction $Tx_j$ may be received from another node 104 acting as a forwarding node 104F. As another possibility, the second transaction $Tx_j$ could be formulated at the node 104 performing the validation, in which case it is received from another internal process of the local node 104.

From wherever it is received, the second transaction $Tx_j$ comprises an input 202 pointing to the output 203 of the first transaction $Tx_i$. The input 202 of the second transaction $Tx_j$ also comprises an unlocking script for unlocking the output of the first transaction $Tx_i$, and thereby having the second transaction $Tx_j$ validated for propagation and/or mining (and therefore ultimately recordal in a block 151 on the blockchain 150). The unlocking script is formulated in the same scripting language as the locking script, i.e. Script in this example.

The extractor 501 is configured to automatically extract the non-Script code 302 from the first transaction $Tx_i$ and pass the extracted non-Script code 302 to the non-Script program launcher 502 to execute (run). Alternatively, it is not excluded that the non-Script code could be included in, and extracted from, another existing transaction 152 on the blockchain 150. The following will be described in terms of the non-Script code 302 being embedded in the same transaction as the locking script 301 which is being used to validate the second transaction $Tx_j$, but it will be appreciated that this is not necessarily limiting to all possible embodiments.

Where the non-Script code 302 is embedded in the same transaction as the locking script 301, i.e. the first transaction $Tx_i$, there are a number of options for this. Since the inclusion of the non-Script code 302 is a non-standard element, then in principle it can be included anywhere in the first transaction $Tx_i$ (either in the same spendable output as the respective locking script 301, or in another output such as an unspendable output, or elsewhere such as appended to the transaction) as long as the extractor 501 is configured to know where to look for it or how to find it in the transaction data structure. This could be achieved by including the non-Script code 302 at a predetermined position or in a predetermined field of the transaction 152 ($Tx_i$ in this example). In this case the extractor 501 is pre-configured to extract the non-Script code 302 from the predetermined field or position. Alternatively the position of the non-Script code 302 in the transaction data structure could be indicated with a code marker. For instance, in some embodiments a non-standard (non-Script) code marker could be used, such as NSC_{ . . . }, where the portion between the curly braces comprises the non-script code 302. As another option however, the non-Script code 302 could be embedded in one of the outputs 203 of the first transaction $Tx_i$ (e.g. embedded in the locking script 301 itself) by using an opcode of the scripting language of the locking script 301, i.e. in this example using a Script OP code.

The Script OP code used for this could be an OP_RETURN. In this case the non-Script code 302 is included in a separate output 203 than the locking script 301. An OP_RETURN has the effect of terminating the script of any output 203 in which it is included when run by the script engine 452 of a node 104. Hence OP_RETURN renders the output in which it included unspendable. This enables the output in question to be used instead to carry any arbitrary payload data.

As another example, a Script OP code such as OP_DROP or OP_PUSHDATA could be used to embed the non-Script code in the locking script 301 itself, in the same output 203. For instance, OP_DROP tells the script engine 452 to ignore whatever comes before the OP_DROP during execution of the unlocking script. This can be used to include the non-Script code 302 in the locking script 301 without causing an error when the locking script 301 is run by the script engine 452. OP_PUSHDATA tells the script engine 452 to push the next N bytes to the stack 453 e.g. OP_PUSHDATA4 say pus the next 4 bytes to the stack). This could be used to push non-Script code onto the stack 453, and the extractor 501 would then read the non-Script code from the stack 453.

Whatever extraction means are employed, the extractor 501 passes the extracted non-Script code 302 to the program launcher 502 to run. In embodiments the extractor 501 may also remove the non-Script code 302 (and any non-Script code marker), leaving only the standard transaction format comprising only standard Script 301 in the output(s) 203 to be run by the script engine 452. However in other embodiments such as those using OP_RETURN, OP_DROP or OP_PUSHDATA, this is not necessary, as the locking Script 301 is already written so as to ignore or render ineffectual the non-Script code 302 when encountered by the script engine 452.

The program launcher 502 is configured to run the non-Script code 302 received from the extractor 501. The non-Script code 302 could comprise any high or low level language. It may comprise for example any scripting language, language requiring compilation, language requiring linking, language requiring assembly, and/or an interpreted language. The running of the non-Script code 302 by the code launcher 452 may comprise any one or more of: compiling, linking, assembling and/or interpreting, depending on the language. For instance the non-Script code 302 could be C, C++, Python, Java script, BASIC, etc., or even a combination of languages. In embodiments the non-Script code launcher 502 may take the form of a virtual machine. It may refer to one or more libraries 303 to run the non-Script code 302, e.g. by linking to the library or libraries 303.

When run by the code launcher 502, the non-Script code 302 performs one or more operations which result in one or more first values being output to a storage location readable by the first language recognized by the standard script engine 452. Physically this storage location could be any non-volatile memory, RAM, or even one or more registers. In the case where the first language is a stack-based language such as Script, then the storage location is the stack 453. However, the possibility of a non-stack based first language in other blockchain implementations is not excluded. By way of example the following will be described in terms of a stack based implementation where the destination storage location for the value(s) output by the non-Script code 302 is the stack 453, making it accessible to the stack-based scripting language (e.g. Script) recognised by the script engine 452, but it will be appreciated that this is not necessarily limiting.

The locking script 301 of the first transaction $Tx_i$ is configured such that outputting "true", and thereby enabling validation, is dependent on at least one of the values written to the stack 453 by the non-Script code 302. Hence validation of the second transaction $Tx_j$ is forced to be conditional on running the non-Script code 302 at the respective node 104.

Beyond this, the specific condition placed by the locking script 301 on the value(s) written to the stack 453 by the non-Script code 302 could be virtually anything that a user or developer desires. In the example given where the payer is Alice, i.e. the output 203 of the first transaction $Tx_i$ is locked to Alice, then the non-Script code 302 may be some code that Alice wishes to pay a miner to execute for her, e.g. to perform some computational analysis or machine learning task on the network 106 instead of Alice's own equipment 103a. The expected output value of the non-Script code 301 could for example be a desired outcome, or evidence that the non-Script code 302 has been properly executed.

For instance, in embodiments Bob 103b may be miner (so his computer equipment 102b comprises a mining node 104M rather than just end-user equipment). The input 202 of the second transaction $Tx_j$ points to the output 203 of the first transaction $Tx_i$ which is locked to Alice, and the second transaction $Tx_j$ has an output 203 locked to miner Bob or another party. So in this scenario Alice is paying Bob at least the mining fee, and possibly also an explicit fee, in order to run her desired software. The output of the non-Script code 302 can be pushed to the stack 453 running in the Script code allowing for OP_CODES to be applied. The value returned (the "first" value) can then be used to unlock other scripts or to unlock and complete the same script that the loader was in. Bob has to run the non-Script software 302 or else the second transaction $Tx_j$ won't be validated and he won't receive his fee. The output 203 containing the locking script 301 could specify a dust (negligible) amount of the digital asset, whereas the input 202 of the first transaction $Tx_i$ is a non-negligible amount, so that in effect only the miner is being paid. Alternatively another party could be being paid by the output 203 (or another output) as well.

As an example of the condition placed on the output value (the "first" value) of the non-Script code 302, the script engine 452 may be configured to receive a second value, compare the second value to the first value (the value output by the non-Script code 302), and output a result of true on condition that the first and second values match. The second value could be received from the input 202 of the second transaction $Tx_j$, or from another source such as a user input (e.g. by the miner Bob) or being pre-stored locally at the node 104 that is running the non-Script code 302. It will be appreciated that "first" and "second" in this context are again just arbitrary labels and do not necessarily imply anything about the order in which the values are generated.

For instance, the locking script 301 in the output 203 of the first transaction $Tx_i$ could be:

{Non Script Code 1}⟨ Expected Output⟩ OP_EQUALVERIFY

In which case, in order to have a valid second transaction $Tx_j$, the unlocking script in the input 202 of the second transaction $Tx_j$ would be:

{Non Script Code 1 Input}

Here, ⟨ ⟩ denotes pushing to the stack and { } denotes non-Script code executed externally with output pushed to the stack. The Expected Output is the first value (the value output by the non-Script code 302 to the stack 453), and Non Script Code 1 Input is the second value, i.e. that being compared to the output of the non-Script code 302.

In this example it is required that the first value is identical to the second value in order to validate the second transaction. However more generally, a match could be require identical values or could allow some other criterion for a match, e.g. the first and second values being within a margin of error in the case where the values are numbers, or being synonyms of the values are words, etc.

In further examples, the locking script 301 could be conditional on more than one value to be output by the non-Script code.

For example the locking script 301 in the output 203 of the first transaction $Tx_i$ could be:

{Non Script Code 1}⟨ Expected Output ⟩ OP_EQUALVERIFY{Non Script Code 2}

And the corresponding unlocking script in the input 202 of the second transaction $Tx_j$ would be:

{Non Script Code 2 Input}{Non Script Code 1 Input}

The execution of the example script above is shown in FIG. 6.

In this example it is required that each of two first values (expected values) output by the non-Script code 302 is equal to a respective one of two corresponding second values (in this case both specified in the input of the second transaction $Tx_j$). In other examples the locking script 301 could specify that the condition is met if, e.g., either one of the two values matches its respective second value (i.e. a logical OR, such that both matches are not necessarily required). Another example would be an XOR. These ideas could also be extended to more than two first values and their corresponding second values.

The evaluation of the script is done using a hybrid on-chain/off-chain mechanism where the inputs and outputs are recorded on-chain, verification of conditions is performed on-chain but complex conditions are evaluated off-chain. This provides a method for miners to perform paid decentralized computations should they choose to specialize in this.

In the above examples, as no signature is required to redeem the transaction, anyone can submit inputs by attempting to spend the transaction and any verification conditions can be implemented in ⟨ Non Script Code 1 ⟩. Alternatively however, one or more further conditions for validation (not dependent on the non-Script code 302) could additionally be imposed by the locking script 301 of the first transaction $Tx_i$. These could comprise one or more conventional conditions, such as authenticating a signature of Bob included in the unlocking script of the second transaction $Tx_j$, or that the unlocking script of the second transaction $Tx_j$ provides the solution to a hash puzzle set in the locking script 301 of the first transaction $Tx_i$.

It will be appreciated that the above embodiments have been described by way of example only.

More generally, according to one aspect disclosed herein there is a provided computer-implemented method performed by a node of a blockchain network, wherein copies of a blockchain are maintained across at least some of the nodes of the blockchain network, the blockchain comprising a chain of blocks each comprising one or more transactions, each transaction comprising one or more outputs, and each output comprising a locking script formulated in a first language. The method comprises: accessing the locking script from at least a first output of a first of said transactions, the locking script of the first output specifying, in the first language, one or more conditions for unlocking said first output; and receiving a second transaction not yet recorded on blockchain, wherein the second transaction comprises an input comprising an unlocking script formulated in the first language. The method further comprises: extracting, from the first transaction or another of the transactions on the blockchain, a portion of code formulated in a second language other than the first language; running the extracted portion of code in the second language, wherein as a result thereof the code generates at least one first value; writing the first value to a storage location readable by the locking script in the first language; and running, in the first language, the locking script from the first output of the first transaction together with the unlocking script from the second transaction, thereby evaluating the one or more conditions, the method comprising validating the second transaction on condition of said one or more conditions being met. The unlocking script is configured to read the first value from said storage location, and the one or more conditions comprise a condition dependent on the first value.

In embodiments, the first language may be a stack-based language for placing values onto a stack and reading values from the stack, and the second language may be a non-stack-based language. In this case said storage location may be the stack.

In embodiments the second language may be Turing complete and the first may not be Turing complete.

In embodiments the first language may be Script and the second language may be a non-Script language.

In embodiments said portion of code may be extracted from the first transaction.

In some such embodiments, said portion of code may be stored in the first output of the first transaction, and said extracting may comprise extracting the portion of code from said first output. For instance said portion of code may be embedded in the locking script of the first output, said extracting comprising extracting the portion of code from the locking script of said first output.

Alternatively, said portion of code may be stored in a second, unspendable output of the first transaction, and said extracting may comprise extracting the portion of code from the second output.

In embodiments, the unlocking script may be configured to compare the first value to a second value, and the condition dependent on the first value may comprise: a condition that the first value matches the second value.

In embodiments, the second value may be included in the second transaction. In tis case the method may comprise extracting the second value from the second transaction, and said comparing may comprise comparing the first value with the second value as extracted from the second transaction.

In embodiments, the second value may be included in the input of the second transaction, the extracting of the second value comprising extracting the second value from the input of the second transaction. For instance the second value may be embedded in the unlocking script, the extracting of the second value comprising extracting the second value from the input of the second transaction.

In alternative embodiments the second value may be determined by a user input, or may be pre-stored at the node performing said method.

In embodiments, as a result of running the extracted portion of code, the code may output a plurality of first values. Said comparing may comprise comparing each of the first values with a respective one of a plurality of second values, and the condition depended on the first value may comprise: a condition that at least one of the first values matches the respective second value.

For instance, said condition dependent on the first value may comprise: a condition that each of the first values matches the respective second value. Alternatively said condition dependent on the first value comprises: a condition that any of the first values matches the respective second value.

In embodiments, the conditions may additionally comprise one or more other conditions evaluated based only on the unlocking script and not said portion of code in the second language. For instance, the one or more other conditions may comprises a condition that the locking script, when run, authenticates a cryptographic signature in the unlocking script as being the signature of a party to whom the locking script is locked.

In embodiments, said portion of code may be stored in the first transaction in compressed form, in which case said running of the portion of code includes decompressing the compressed form of the code.

In embodiments, the node performing the method may be a mining node. In this case the method may comprise including the second transaction in a pool of transactions on condition of said validation, and racing to mine the pool of transactions into a new block of the blockchain.

In embodiments the node performing the method may be a forwarding node. In this case the method may comprise forwarding the second transaction to at least one others of the nodes of the blockchain network on condition of said validation.

In embodiments the node performing the method may be a storage node. In this case the method may comprise storing part or all of the blockchain including a new block comprising the second transaction once validated and thereby mined into the new block.

According to another aspect disclosed herein, there is provided a computer program embodied on computer-readable storage and configured so as when run on a node of a blockchain network to perform a method in accordance with any embodiment disclosed herein.

According to another aspect there is provided a node of a blockchain network, comprising: processing apparatus comprising one or more processors, memory comprising one or more memory devices, and a network interface for receiving transactions; wherein the memory stores software arranged to run on the processing apparatus, the software being configured so as when run to perform a method according to any aspect disclosed herein, the second transaction being received via the network interface.

According to another aspect there is provided a set of transactions for recordal in a blockchain, the set comprising, embodied on a computer-readable data medium or media: a first transaction comprising at least first output, the first output comprising a locking script formulated in a first language, wherein the locking script specifies, in the first language, one or more conditions for unlocking said first output; and a second transaction comprising an input, the input comprising an unlocking script formulated in the first language; wherein the first transaction comprises an embedded portion of code formulated in a second language other than the first language, said portion of code being configured so as when run on a node of a blockchain network to generate at least one first value, and to write the first value to a storage location readable by the locking script in the first language; and wherein the unlocking script is configured to read the first value from said storage location, and the one or more conditions specified in the locking script comprise a condition dependent on the first value.

According to another aspect disclosed herein, there may be provided a method comprising the actions of the first party, second party, any third party that may be involved, and/or any one or more of the network of nodes.

According to another aspect disclosed herein, there may be provided a system comprising the computer equipment of the first party, the computer equipment of the second party, the computer equipment of any third party, and/or any one or more of the network of nodes.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method performed by a node of a plurality of nodes of a blockchain network, wherein copies of a blockchain are maintained across at least some of the nodes of the blockchain network, the blockchain comprising a chain of blocks each comprising one or more transactions, each transaction comprising one or more outputs, and each output comprising a locking script formulated in a first language, the method comprising:
   accessing the locking script from at least a first output of a first of said transactions, the locking script of the first output specifying, in the first language, one or more conditions for unlocking said first output;
   receiving a second transaction not yet recorded on the blockchain, wherein the second transaction comprises an input comprising an unlocking script formulated in the first language;
   extracting, from the first transaction or another of the transactions on the blockchain, a portion of code formulated in a second language other than the first language;
   running the extracted portion of code in the second language, wherein as a result thereof the code generates a first value;
   writing the first value to a storage location readable by the locking script in the first language; and
   running, in the first language, the locking script from the first output of the first transaction together with the unlocking script from the second transaction, thereby evaluating the one or more conditions, the method comprising validating the second transaction on condition of said one or more conditions being met;
   wherein the unlocking script is configured to read the first value from said storage location, and the one or more conditions comprise a condition dependent on the first value.

2. The method of claim 1, wherein the first language is a stack-based language for placing values onto a stack and reading values from the stack, and wherein the second language is not stack-based; said storage location being the stack.

3. The method of claim 1, wherein the second language is Turing complete and the first language is not Turing complete.

4. The method of claim 1, wherein the first language is Script and the second language is a non-Script language.

5. The method of claim 1, wherein said portion of code is extracted from the first transaction.

6. The method of claim 5, wherein said portion of code is stored in the first output of the first transaction, and said extracting comprises extracting the portion of code from said first output.

7. The method of claim 6, wherein said portion of code is embedded in the locking script of the first output, said extracting comprises extracting the portion of code from the locking script of said first output.

8. The method of claim 5, wherein said portion of code is stored in a second unspendable output of the first transaction, and said extracting comprises extracting the portion of code from the second unspendable output.

9. The method of claim 1, wherein the unlocking script is configured to compare the first value to a second value, and the condition dependent on the first value comprises: a condition that the first value matches the second value.

10. The method of claim 9, wherein the second value is included in the second transaction, the method comprising extracting the second value from the second transaction, and said comparing comprising comparing the first value with the second value as extracted from the second transaction.

11. The method of claim 10, wherein the second value is included in the input of the second transaction, the extracting of the second value comprising extracting the second value from the input of the second transaction.

12. The method of claim 11, wherein the second value is embedded in the unlocking script, the extracting of the second value comprising extracting the second value from the input of the second transaction.

13. The method of claim 9, wherein the second value is determined by a user input.

14. The method of claim 9, wherein the second value is pre-stored at the node performing said method.

15. The method of claim 9, wherein:
as a result of running the extracted portion of code, the code outputs a plurality of first values; and
said comparing comprises comparing each of the first values with a respective one of a plurality of second values, and the condition dependent on the first value comprises: at least a condition that one of the first values matches the respective second value.

16. The method of claim 15, wherein said condition dependent on the first value comprises: a condition that each of the first values matches the respective second value.

17. The method of claim 15, wherein said condition dependent on the first value comprises: a condition that any of the first values matches the respective second value.

18. The method of claim 1, wherein the one or more conditions additionally comprise one or more other conditions evaluated based only on the unlocking script and not said portion of code in the second language.

19. A computer program product comprising a computer program embodied on a non-transitory computer-readable storage and configured to run on a node of a plurality of nodes of a blockchain network, wherein copies of a blockchain are maintained across at least some of the nodes of the blockchain network, the blockchain comprising a chain of blocks each comprising one or more transactions, each transaction comprising one or more outputs, and each output comprising a locking script formulated in a first language; the code being configured so as when run on the node of the blockchain network the node performs a method of:
accessing the locking script from at least a first output of a first of said transactions, the locking script of the first output specifying, in the first language, one or more conditions for unlocking said first output;
receiving a second transaction not yet recorded on the blockchain, wherein the second transaction comprises an input comprising an unlocking script formulated in the first language;
extracting, from the first transaction or another of the transactions on the blockchain, a portion of code formulated in a second language other than the first language;
running the extracted portion of code in the second language, wherein as a result thereof the code generates one or more values including at least a first value;
writing the first value to a storage location readable by the locking script in the first language; and
running, in the first language, the locking script from the first output of the first transaction together with the unlocking script from the second transaction, thereby evaluating the one or more conditions, the method comprising validating the second transaction on condition of said one or more conditions being met;
wherein the unlocking script is configured to read the first value from said storage location, and the one or more conditions comprise a condition dependent on the first value.

20. A node of a plurality of nodes of a blockchain network, wherein copies of a blockchain are maintained across at least some of the nodes of the blockchain network, the blockchain comprising a chain of blocks each comprising one or more transactions, each transaction comprising one or more outputs, and each output comprising a locking script formulated in a first language, the node comprising:
processing apparatus comprising one or more processors, memory comprising one or more memory devices, and a network interface for receiving transactions;
wherein the memory stores software arranged to run on the processing apparatus, the software being configured so as when run the node performs a method of:
accessing the locking script from at least a first output of a first of said transactions, the locking script of the first output specifying, in the first language, one or more conditions for unlocking said first output;
receiving a second transaction not yet recorded on the blockchain, wherein the second transaction comprises an input comprising an unlocking script formulated in the first language, the second transaction is received via the network interface;
extracting, from the first transaction or another of the transactions on the blockchain, a portion of code formulated in a second language other than the first language;
running the extracted portion of code in the second language, wherein as a result thereof the code generates at least one first value;
writing the at least one first value to a storage location readable by the locking script in the first language; and
running, in the first language, the locking script from the first output of the first transaction together with the unlocking script from the second transaction, thereby evaluating the one or more conditions, the method comprising validating the second transaction on condition of said one or more conditions being met;
wherein the unlocking script is configured to read the at least one first value from said storage location, and the one or more conditions comprise a condition dependent on the at least one first value.

* * * * *